United States Patent Office 3,817,902
Patented June 18, 1974

3,817,902
SILICONE RESIN COMPOSITIONS
Shiro Gomyo, Yasuhisa Tanaka, and Yoshio Fujimura, Gunma-ken, Japan, assignors to Shinetsu Chemical Company, Tokyo, Japan
No Drawing. Filed July 6, 1973, Ser. No. 377,123
Claims priority, application Japan, July 11, 1972, 47/69,467
Int. Cl. C08g 51/28, 51/34
U.S. Cl. 260—32.8 SB          8 Claims

ABSTRACT OF THE DISCLOSURE

Compositions comprising (1) organopolysiloxane, containing vinyl groups bonded to Si atoms, (2) alkoxysilane or alkoxypolysiloxane, (3) alkoxysilane or alkoxypolysiloxane, having amino groups, (4) a hydrophilic organic solvent, (5) a solvent for component (1) above, and (6) a curing agent. These compositions are useful for molding silicone resin compositions. With them, molded articles having excellent properties in water and moisture resistance as well as mechanical strength and electrical properties at high temperatures can be prepared by a simple molding process.

FIELD OF THE INVENTION

The present invention relates to silicone resin compositions. More particularly, it relates to silicone resin compositions especially adapted for molding.

DESCRIPTION OF THE PRIOR ART

It has been known that molding silicone resins, either alone or with addition of a variety of fillers, such as glass fillers, e.g., glass fiber or glass cloth; mica fillers, e.g., cleaved mica, composite mica, or pulverized mica; asbestos fillers, or inorganic fillers, have good electrical properties and heat resistance, and can be useful for the manufacture of electrical insulation materials. For example, however, the silicone resin composition described in U.S. Pat. No. 2,658,881, which is curable by dehydrocondensation, require three stages of operation in molding, i.e., pre-cure, press-cure and after-cure, in the presence of a condensation catalyst, resulting in great disadvantages of much labor and time. Also, the silicone resin composition disclosed in U.S. Pat. No. 2,645,628, which is curable by vinyl polymerization in the presence of an organic peroxide as the polymerization catalyst, are not proved to be satisfactory because of its poor water resistance and thermal stability.

Other known molding resins are alkyd, polyester, epoxy, and acryl resins, which are blended with the above-mentioned fillers. They are inferior in heat and water resistance, although superior in mechanical strength.

SUMMARY OF THE INVENTION

The primary object of the present invention is to offer silicone resin compositions which will give films and other molded articles having superior water-resistance, mechanical strength and electrical properties at high temperatures. Further, the secondary object of the invention is to offer silicone resin compositions which will give molded articles by a simple molding process, i.e., a simple combination of the pre-cure and press-cure stages, excluding the after-cure stage which is required in a usual curing process.

The silicone resin composition of this invention comprises the following components:

(1) 100 parts by weight of an organopolysiloxane, containing vinyl groups, represented by the average formula $$R^1{}_a(CH_2=CH)_b SiO_{\frac{4-a-b}{2}}$$

where $R^1$ is the same or different substituted or unsubstituted monovalent hydrocarbon group, and $a$ and $b$ are positive numbers, $b$ being from 0.05 to 0.5 and $(a+b)$ being from 1 to 2, (2) from 2 to 70 parts by weight of an alkoxy silane, represented by the general formula $$R^2{}_c Si(OR^3)_{4-c}$$

where $R^2$ and $R^3$ are each the same or different substituted or unsubstituted monovalent hydrocarbon groups, and $c$ is 1 or 2, or its partially hydrolyzed alkoxy polysiloxane, (3) from 1 to 60 parts by weight of an alkoxy silane, containing amino groups, represented by the general formula $$Z-NH-R^4-Si(OR^5)_d R^6{}_{3-d}$$

where $R^4$ is a divalent hydrocarbon group having from 1 to 4 carbon atoms, $R^5$ and $R^6$ are each the same or different substituted or unsubstituted monovalent hydrocarbon groups, Z is a hydrogen atom or an aminoalkyl group and $d$ is 1, 2 or 3, or its partially hydrolyzed alkoxy polysiloxane, (4) from 5 to 100 parts by weight of a hydrophilic organic solvent, (5) a solvent for component (1) above, and (6) an organic peroxide in a catalytic amount.

The silicone resin compositions of the present invention are suitable for molding to produce articles which have superior water and moisture resistance as well as, at high temperatures, good electrical properties and excellent mechanical strength. What is better, the curing of the compositions can be carried out merely by pre-cure and press-cure with no addition of any catalyst or curing agent, so that the operation is very simple.

The vinyl group containing organopolysiloxane, component (1), above is the main component of the composition, and the monovalent hydrocarbon group denoted by $R^1$ is exemplified by methyl, ethyl, propyl, butyl, or phenyl group, or substituted groups thereof. The organopolysiloxane can be prepared by a known procedure, for example, cohydrolyzing the mixture of (i) at least one organochlorosilane selected from the group consisting of $(CH_3)_2SiCl_3$, $(C_2H_5)_2SiCl_3$, $(C_2H_5)CH_3SiCl_2$, $(C_3H_7)CH_3SiCl_2$, $(C_4H_9)CH_3SiCl_2$, $(C_3H_7)_2SiCl_2$, $$(CH_3)C_6H_5SiCl_2$$

$(C_2H_5)C_6H_5SiCl_2$, $(C_6H_5)_2SiCl_2$, $CH_3SiCl_3$, $C_2H_5SiCl_3$, $C_3H_7SiCl_3$, $C_4H_9SiCl_3$, $C_6H_5SiCl_3$ and (ii) at least one organochlorosilane containing a vinyl group, selected from the group consisting of $CH_2=CH\cdot SiCl_3$, $$(CH_3)CH_2=CH\cdot SiCl_2$$

$(C_6H_5)CH_2=CH\cdot SiCl_2$, $(C_2H_5)CH_2=CH\cdot SiCl_2$, then partially dehydrocondensing the cohydrolyzate and finally subjecting the resulting product to condensation reactions in the presence of a known catalyst, such as hydroxide of alkali metal, to easily obtain organopolysiloxanes, containing vinyl groups but substantially not containing silanol groups. Example of such organopolysiloxanes are vinylmethylphenyl polysiloxane and vinylethylphenyl polysiloxane.

The organoalkoxysilane or organoalkoxy siloxane, component (2), is one of the essential material in the preparation of the silicone resin compositions of the present invention. It is required to contain alkoxy groups. The appropriate amount of component (1) to be used is in the range of from 2 to 70 parts by weight against 100 parts by weight of component (1). If the amount of component (2) is smaller than 2 parts by weight, the blistering phenomenon takes place at the time of molding, and the molded articles thus produced will exhibit poor water and moisture resistance, with their electrical and mechanical properties being degraded after moisture and water are absorbed. On the other hand, if it is greater than 70 parts by weight, the molded products will fail to possess satisfactorily high mechanical strength. The substituted or unsubstituted monovalent hydrocarbon groups denoted by $R^2$ and $R^3$ in the general formula of component (2) are exemplified by methyl, ethyl, propyl, butyl or phenyl group, or substituted groups thereof.

Examples of component (2) are $CH_3Si(OCH_3)_3$, $(CH_3)_2Si(OCH_3)_2$, $CH_3Si(OC_2H_5)_3$, $C_2H_5Si(OCH_3)_3$, $C_3H_7Si(OCH_3)_3$, $C_4H_9Si(OCH_3)_3$, $C_6H_5Si(OCH_3)_3$, $$(C_6H_5)CH_3Si(OCH_3)_2$$

$(C_6H_5)_2Si(OCH_3)_2$, $C_6H_5Si(OC_2H_5)_3$, $C_6H_5Si(OC_3H_7)_3$, $(C_6H_5)CH_3Si(OC_2H_5)_2$, $C_6H_5Si(OCH_3)_2(OC_6H_5)$ and partial hydrolyzates thereof.

The alkoxy silane or alkoxy polysiloxane, component (3), is characterized by amino groups contained therein. The amino groups work as a catalyst in the condensation reaction of alkoxy groups of components (2) and (3) and also are useful for uniformly blending component (1) with a filler or fillers in the molding of the composition of the present invention. This component (3) is used in an amount in the range of from 1 to 60 parts by weight based on 100 parts by weight of component (1). If the amount is outside of the above range, the disadvantages similar to the case of component (2) are induced. The divalent hydrocarbon group denoted by $R^4$ in the general formula for component (3) is exemplified by methylene, ethylene, propylene or butylene group having from 1 to 4 carbon atoms; $R^5$ and $R^6$ are the same substituted or unsubstituted monovalent hydrocarbons as $R^2$ and $R^3$, above, and Z is a hydrogen atom or an aminoalkyl group, such as aminomethyl, aminoethyl, aminopropyl, aminobutyl or aminopentyl. The examples of component (3) are

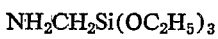
$NH_2CH_2Si(OC_2H_5)_3$

$NH_2CH_2CH_2NHCH_2Si(OCH_3)_3$

$NH_2CH_2CH_2CH_2Si(OCH_3)_3$

$NH_2CH_2CH_2CH_2Si(OC_2H_5)_3$

$NH_2CH_2CH_2NHCH_2CH_2CH_2Si(OCH_3)_3$

$NH_2CH_2CH_2NH \cdot CH_2CH_2CH_2SiCH_3(OCH_3)_2$ and partial hydrolyzates thereof.

The hydrophilic organic solvent, component (4), is a solvent which possesses high solubility in water, or is soluble in water to some extent at least. It is used in an amount of from 5 to 100 parts by weight based on 100 parts by weight of component (1). If the amount is larger than 100 parts by weight, component (1) loses its miscibility with this solvent and, therefore, component (5) to be described hereinafter would have to be added in excess. On the other hand, if the amount is smaller than 5 parts by weight, the resulting product will exhibit poor electrical and mechanical properties at high temperatures. Examples of component (4) are methyl alcohol, ethyl alcohol, allyl alcohol, n-propyl alcohol, isopropyl alcohol, tertiary butyl alcohol, acetone, acetonyl acetone, diacetone alcohol, dioxolane, dioxane, ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, diethylene glycol diethyl ether, monopropylene glycol methyl ether, dipropylene glycol methyl ether, tripropylene glycol methyl ether, ethylene glycol monomethyl ether acetate, diethylene glycol monomethyl ether acetate, diethylene glycol mono- ethyl ether acetate, ethylene chlorohydrin, and propylene chlorohydrin.

The solvent for component (1), as described as component (5) is employed in order to make component (1) more easily soluble in component (4). Component (5) works also as a common solvent for components (2) and (3). It is employed, for example, in the application of the composition of the invention to surfaces of composite mica in such an amount that the use of a brush for the application may be made easy, with the non-volatile matter contained being from about 5 to 15% of the total composition, though not limited thereto. Its examples are nonpolar solvents, such as benzene, toluene and xylene.

The organic peroxide, component (6), is a catalyst for vinyl polymerization of vinyl group-containing organopolysiloxane and works to sufficiently cure the compositions of the present invention. Example of such organic peroxides are benzoyl peroxide, dicumyl peroxide, 2,4-dichlorobenzoyl peroxide, cyclohexanone peroxide, 2,5-dimethyl-2,5-ditertiary peroxyhexane, and tertiary butylcumyl peroxide.

There is no particular order in which the various components should be added in the formulation. Usually, however, component (1) is added to component (5), and the resulting mixture is then added and mixed with components (2), (3) and (4), together or individually. By this manner, the silicone resin compositions of the present invention may be easily obtained.

The compositions of the present invention described above may be used by itself as paint vehicles. They may also be used for preparing molding compounds by blending them with various types of fillers, say, inorganic fillers such as glass fiber, white carbon, iron oxide, powered mica and powdered quartz or various organic fillers. Further, the compositions of the invention are useful for preparing molding composite materials by applying them to glass cloths, asbestos sheets, composite mica, etc., by means of spraying, brushing, dipping or roller coating. In the preparation of these compounds or materials, the amount of the silicone resin compositions to be impregnated or coated has no limitation and is arbitrary, depending on their end use, but it is usually in the range from 6 to 50%, preferably from 15 to 40% by weight of the fillers, glass cloths, asbestos sheets, composite mica, etc. based on the weight of the resinous components.

The molding composite materials thus obtained may be employed, for example, in the preparation of laminated sheets by drying them at room temperature for 30 to 120 minutes, then subjecting the dried materials to pre-cure at 100 to 120° C. for 5 to 30 minutes to produce prepregs, placing one on another the prepregs thus produced and then cut in suitable dimensions, so as to obtain a desired thickness, and finally subjecting the thus laminated products to press-cure for 10 to 60 minutes at 130 to 180° C. under the pressure of from 10 to 70 kg./cm.². Such process does not involve the after-curing stage, and are capable of giving composite materials having excellent properties in thermal resistance, water resistance, mechanical strength, and electrical properties.

The following references and examples are illustrative only and should not be construed as limiting the invention. In the references and examples, parts are all parts by weight and a water absorption rate is represented by the quantity of water (percent) absorbed by test pieces placed in water for 24 hours according to Japanese Industrial Standard (JIS) K-6911.

EXAMPLE 1

To 100 parts of a mixture consisting of 55.6 mol percent of phenyltrichlorosilane, 12.2 mol percent of methyltrichlorosilane, 12.2 mol percent of dimethyldichlorosilane and 20 mol percent of vinylmethyldichlorosilane were added 100 parts of toluene. The mixture thus prepared was added dropwise to a mixture of 200 parts of water and 20 parts of isopropyl alcohol while being stirred, for hydrolysis. After the solution of the hydrolyzate was well washed with water, some of the toluene contained therein was removed by distillation, to produce a 60% concentrated solution of siloxane. Subsequently, to this siloxane was added 0.05% by weight of potassium hydroxide based on the weight of the siloxane, and the resulting mixture was polymerized for 15 hours at the refluxing temperature of 110° C., while condensation water was distilled off. After the residue was cooled, 0.2% by weight of glacial acetic acid, based on the weight of the siloxane, was added to it so as to remove the potassium hydroxide by neutralization. Thereafter, it was heated to 110° C. again, removed of the residuing glacial acetic acid, and the toluene under reduced pressure, to finally obtain a vinyl-group-containing solid organopolysiloxane having a softening point of 70° C.

EXAMPLE 2

A mixture consisting of 30 mol percent of phenyltrichlorosilane, 28 mole percent of methyltrichlorosilane, 32 mol percent of dimethyldichlorosilane, and 10 mol percent of vinyltrichlorosilane was cohydrolyzed by a known method, and 1,000 g. of the siloxane thus prepared was diluted with toluene into the concentration of 40%. To the diluted siloxane was added 10 g. of 28% aqueous ammonia and mixed. The mixture was polymerized, while it was stirred, at 60° C. for 10 hours then the temperature was raised to 100° C., to remove the condensation water and aqueous ammonia. After ammonia still contained therein was neutralized by carbon dioxide gas blown through it, the residue was cooled and filtered, and toluene was removed by distillation under reduced pressure, to obtain a vinyl-group-containing solid organopolysiloxane having a softening point of from 58 to 62° C.

EXAMPLE 3

A mixture consisting of 15 mole percent of phenyltrichlorosilane, 20 mole percent of diphenyldichlorosilane, 40 mol percent of vinylmethyldichlorosilane, and 25 mol percent of dimethyldichlorosilane was cohydrolyzed, and to 1,120 g. of the cohydrolyzate thus prepared were added 250 g. of xylene and 0.28 g. of potassium hydroxide, and the mixture was polymerized at 155° C. for 15 hours. After it was cooled, 2 g. of glacial acetic acid were added to its for neutralization, and then toluene was added in such an amount that the concentration of siloxane became 50%, which, then was filtered. The filtrate was heated and removed of toluene by distillation, to obtain a vinyl group-containing liquid organopolysiloxane having a viscosity of 150,000 cs. at room temperature.

EXAMPLE 4

To 100 parts of the vinyl group-containing organopolysiloxane prepared in Example 1 were added 1.5 parts of dicumyl peroxide. To the mixture were added methylphenyldimethoxysilane, N - trimethoxysilylpropyl)-ethylenediamine

and ethyl alcohol in varied amounts as indicated in Table 1. To each of the various mixtures thus prepared was added toluene so that their nonvolatile matter content became 5%. Each of the compositions prepared was applied by brushing to composite mica to give an application of 15% by weight. Each of the composite mica thus treated was pre-cured at 110° C. for 10 minutes, and then cut into sheets of the size of 20 x 20 cm. 20 pieces of such sheets were piled up, one on top of another, and press-moulded under 50 kg./cm.$^2$ at 180° C. for 30 minutes. After the molded product was cooled, it was taken out and employed as a sample (thickness: 1.10 mm.).

The water absorption, mechanical strength and electrical properties of the samples, as well as their appearance after being heated, are given in Table I.

TABLE I

| Sample number | This invention | | | | | | |
|---|---|---|---|---|---|---|---|
| | 1 | 2 | 3 | 4 | 5 | 6 | 7 |
| Organopolysiloxane, containing vinyl groups (1), parts | 100 | 100 | 100 | 100 | 100 | 100 | 100 |
| Methylphenyldimethoxysilane, parts | 10 | 25 | 40 | 60 | 15 | 15 | 15 |
| N-(trimethoxysilylpropyl)ethylenediamine, parts | 1 | 20 | 25 | 60 | 10 | 10 | 10 |
| Ethyl alcohol, parts | 50 | 50 | 50 | 50 | 10 | 40 | 100 |
| Water absorption, percent | 0.20 | 0.10 | 0.12 | 0.57 | 0.09 | 1.11 | 0.(10 |
| Condition after 1 hr. heating at 200° C | (*) | (*) | (*) | (*) | (*) | (*) | (*) |
| Bending strength, kg./mm.$^2$ | 25.5 | 25.0 | 24.5 | 24.3 | 26.8 | 25.0 | 25.7 |
| Bending strength after 48 hr. immersion in water, kg./mm.$^2$ | 24.0 | 24.0 | 23.5 | 23.8 | 26.0 | 24.3 | 25.3 |
| Dielectric breakdown strength, kv./mm | 60.5 | 62.0 | 59.5 | 58.2 | 62.3 | 60.5 | 61.3 |
| Dielectric breakdown strngth after 48 hr. immersion in water, kv./mm | 57.5 | 60.2 | 58.0 | 57.0 | 59.5 | 58.8 | 60.0 |
| Dissipation factor (tan δ) 50 Hz | 5.2×10$^{-3}$ | 4.4×10$^{-3}$ | 2.5×10$^{-3}$ | 2.2×10$^{-3}$ | 3.8×10$^{-3}$ | 2.2×10$^{-3}$ | 5.4×10$^{-3}$ |
| Dissipation factor (tan δ) after 48 hr. immersion in water, 50 Hz | 7.0×10$^{-3}$ | 7.0×10$^{-3}$ | 3.8×10$^{-3}$ | 3.9×10$^{-3}$ | 6.8×10$^{-3}$ | 3.4×10$^{-3}$ | 9.2×10$^{-3}$ |

| Sample number | Comparative | | | | | |
|---|---|---|---|---|---|---|
| | 1 | 2 | 3 | 4 | 5 | 6 |
| Organopolysiloxane, containing vinyl groups (1), parts | 100 | 100 | 100 | 100 | 100 | 100 |
| Methylphenyldimethoxysilane, parts | 0 | 25 | 0 | 5 | 15 | 15 |
| N-(trimethoxysilylpropyl) ethylenediamine, parts | 0 | 0 | 25 | 70 | 10 | 10 |
| Ethyl alcohol, parts | 50 | 50 | 50 | 50 | 0 | 4 |
| Water absorption, percent | 21.5 | 18.3 | 13.8 | 0.98 | 0.13 | 0.09 |
| Condition after 1 hr. heating at 200° C | () | () | (**) | (*) | () | (*) |
| Bending strength, kg./mm.$^2$ | 23.0 | 15.1 | 17.2 | 19.8 | 22.0 | 23.0 |
| Bending strength after 48 hr. immersion in water, kg./mm.$^2$ | 1.5 | 4.1 | 8.7 | 17.2 | 17.2 | 20.5 |
| Dielectric breakdown strength, kv./mm | 53.8 | 57.3 | 59.1 | 51.3 | 57.8 | 56.8 |
| Dielectric breakdown after 48 hr. immersion in water, kv./mm | 2.3 | 3.8 | 10.4 | 47.2 | 56.2 | 55.0 |
| Dissipation factor (tan δ) 50 Hz | 3.2×10$^{-3}$ | 3.7×10$^{-3}$ | 4.1×10$^{-3}$ | 1.8×10$^{-3}$ | 1.8×10$^{-3}$ | 2.8×10$^{-3}$ |
| Dissipation factor (tan δ) after 48 hr. immersion in water, 50 Hz | (**) | (**) | 1.1×10$^{-1}$ | 5.1×10$^{-3}$ | 3.1×10$^{-3}$ | 5.8×10$^{-3}$ |

*No change was witnessed.
**Blistering was observed.
***Partial blistering was observed.
****Measurement was unavailable.

EXAMPLE 5

To 100 parts of the vinyl group-containing organopolysiloxane prepared in Example 2 were added 1.5 parts of dicumyl peroxide, and to the mixture were added phenyltrimethoxysilane, γ-aminopropyltriethoxysilane

and acetone in amounts given in Table II. To each of the mixtures thus obtained was added toluene so that their nonvolatile matter content became 10%. Using them, samples were prepared as in Example 4, which gave the properties as shown in Table II.

TABLE II

| Sample number | This invention | | | | Comparative, 7 |
|---|---|---|---|---|---|
| | 8 | 9 | 10 | 11 | |
| Organopolysiloxane, containing vinyl groups (2), parts | 100 | 100 | 100 | 100 | 100 |
| Phenyltrimethoxysilane, parts | 2 | 20 | 40 | 70 | 0 |
| γ-Aminopropyltriethoxysilane, parts | 15 | 30 | 20 | 20 | 5 |
| Acetone, parts | 30 | 30 | 30 | 30 | 30 |
| Water absorption, percent | 0.11 | 0.18 | 0.35 | 1.02 | 6.21 |
| Condition after 1 hr. heating at 200° C | (*) | (*) | (*) | (*) | (**) |
| Bending strength, Kg./mm.² | 19.8 | 19.5 | 18.5 | 15.8 | 19.3 |
| Bending strength after 48 hr. immersion in water, kg./mm.² | 17.8 | 19.0 | 17.0 | 13.1 | 10.5 |
| Dielectric breakdown strength, kv./mm | 58.6 | 59.8 | 56.7 | 57.2 | 58.0 |
| Dielectric breakdown strength after 48 hr. immersion in water, kv./mm | 52.6 | 58.0 | 53.5 | 55.3 | 6.8 |
| Dissipation factor (tan δ), 50 Hz | $2.5 \times 10^{-3}$ | $2.1 \times 10^{-3}$ | $6.0 \times 10^{-3}$ | $1.8 \times 10^{-2}$ | $5.3 \times 10^{-3}$ |
| Dissipation factor (tan δ) after 48 hr. immersion in water, 50 Hz | $6.3 \times 10^{-3}$ | $5.6 \times 10^{-3}$ | $1.5 \times 10^{-3}$ | $5.7 \times 10^{-3}$ | $8.0 \times 10^{-1}$ |

*No change was witnessed.
**Partial blistering was observed.

EXAMPLE 6

To 100 parts of the vinyl-group-containing organopolysiloxane prepared in Example 2 were added 2.0 parts of dicumyl peroxide, and to the mixture were added $C_6H_5(CH_3O)_2SiOSi(OCH_3)_2C_6H_5$ and N-(dimethoxymethylsilylpropyl)ethylenediamine and isopropyl alcohol in varied amounts as indicated in Table III. To each of the mixtures thus prepared was added toluene so that their nonvolatile matter content became 15%. Using them, samples were prepared as in Example 4, which gave the properties given in Table III.

TABLE III

| Sample number | This invention | | | | Comparative | |
|---|---|---|---|---|---|---|
| | 12 | 13 | 14 | 15 | 8 | 9 |
| Organopolysiloxane, containing vinyl groups (2), parts | 100 | 100 | 100 | 100 | 100 | 100 |
| 1,3-diphenyl-1,1,3,3-tetramethoxydisiloxane, parts | 10 | 15 | 40 | 60 | 5 | 10 |
| N-(dimethoxymethysilylpropyl)ethylenediamine, parts | 5 | 20 | 5 | 60 | 0 | 10 |
| Isopropyl alcohol, parts | 50 | 30 | 30 | 20 | 50 | 2 |
| Water absorption, percent | 0.81 | 0.19 | 0.52 | 0.80 | 55.8 | 0.95 |
| Condition after 1 hr. heating at 200° C | (*) | (*) | (*) | (*) | (*) | (**) |
| Bending strength, kg./mm.² | 19.8 | 17.8 | 19.0 | 14.7 | 14.5 | 18.5 |
| Bending strength after 48 hr. immersion in water, kg./mm.² | 18.5 | 16.0 | 18.0 | 13.1 | 6.5 | 17.6 |
| Dielectric breakdown strength, kv./mm | 56.2 | 55.0 | 58.3 | 53.9 | 55.5 | 58.0 |
| Dielectric breakdown strength after 48 hr. immersion in water, kv./mm | 55.8 | 52.3 | 55.2 | 53.6 | 5.8 | 54.5 |
| Dissipation factor (tan δ) 50 Hz | $1.6 \times 10^{-3}$ | $6.5 \times 10^{-3}$ | $5.6 \times 10^{-3}$ | $5.1 \times 10^{-3}$ | $2.5 \times 10^{-3}$ | $2.5 \times 10^{-3}$ |
| Dissipation factor (tan δ) after 48 hr. immersion in water, 50 Hz | $3.8 \times 10^{-3}$ | $3.8 \times 10^{-3}$ | $7.2 \times 10^{-3}$ | $6.1 \times 10^{-3}$ | $6.0 \times 10^{-1}$ | $3.0 \times 10^{-3}$ |

*No change was witnessed.
**Partial blistering was observed.

EXAMPLE 7

To 100 parts of the vinyl group-containing liquid organopolysiloxane prepared in Example 3 were added 2.0 parts of tertiary butyl cumyl peroxide, and to the mixture were added (i) a mixture consisting of methyltriethoxysilane and phenyltriisopropoxysilane (1:1 by weight), (ii) N-β-aminoethylaminomethyltrimethoxysilane ($NH_2CH_2CH_2NHCH_2Si(OCH_3)_3$) and (iii) ethylene glycol monomethyl ether in amounts given in Table IV. To each of the mixtures thus prepared was added toluene so that their nonvolatile matter content might be 10%. Using them, samples were prepared just as in Example 4, which gave the properties as shown in Table IV.

EXAMPLE 8

To 100 parts of the vinyl group-containing solid organopolysiloxane prepared in Example 1 were added 1.5 parts of dicumyl peroxide, 15 parts of phenyltrimethoxysilane, 7 parts of N-(trimethoxysilylpropyl)-ethylene diamine, and 40 parts of isopropyl alcohol. To the mixture thus prepared was added toluene so that its nonvolatile matter content became 60%. Glass cloth (WE 18 G, product of Nitto Spinning Co.) was impregnated with it, and dried with heat at 110° C. for 20 minutes so as to evaporate the solvent. The amount by weight of the composition thus applied to the cloth proved to be 40%. 20 pieces of such impregnated glass cloth were piled up, one on top of another, and pressed under the molding pressure of 50 kg./cm.² at 180° C. for 20 minutes. The product obtained had the properties given in Table V. Its mechanical strength and electrical properties after it was soaked in water proved to be particularly good.

TABLE V

| | |
|---|---|
| Water absorption (persent) | 0.08 |
| Bending strength (kg./mm.²) | 19.0 |
| Bending strength after 48 hr. immersion in water (kg./mm.²) | 1.78 |
| Puncture of withstand voltage (kv./mm.) | 29.0 |
| Puncture of withstand voltage after 48 hr. immersion in water (kv./mm.) | 27.0 |
| Volume resistivity (Ω-cm.) | $2.7 \times 10^{15}$ |
| Volume resistivity after 48 hr. immersion in water (Ω-cm.) | $5.8 \times 10^{14}$ |
| Dielectric constant (50 Hz.) | 3.8 |
| Dielectric constant after 48 hr. immersion in water (50 Hz.) | 3.9 |
| Dissipation factor (tan δ) (50 Hz.) | $2.1 \times 10^{-3}$ |
| Dissipation factor (tan δ) after 48 hr. immersion in water (50 Hz.) | $5.3 \times 10^{-3}$ |

TABLE IV

| Sample number | This invention | | | Comparative, 10 |
|---|---|---|---|---|
| | 16 | 17 | 18 | |
| Organopolysiloxane, containing vinyl groups (3) (parts) | 100 | 100 | 100 | 100 |
| Methyltriethoxysilane/phenyltriisopropoxysilane (1/1) (parts) | 5 | 15 | 30 | 10 |
| N-β-aminoethylaminomethyltrimethoxysilane (parts) | 30 | 30 | 30 | 0 |
| Ethylene glycol monomethyl ether (parts) | 30 | 30 | 30 | 30 |
| Water absorption (percent) | 1.01 | 0.99 | 0.87 | 8.50 |
| Condition after 1 hr. heating at 200° C | (*) | (*) | (*) | (**) |
| Bending strength (kg./mm.²) | 16.0 | 15.2 | 15.0 | 13.0 |
| Bending strength after 48 hr. immersion in water (kg./mm.²) | 14.8 | 14.3 | 14.0 | 2.8 |
| Dielectric breakdown strength (kv./mm.) | 50.0 | 50.2 | 49.2 | 49.0 |
| Dielectric breakdown strength after 48 hr. immersion in water (kv./mm.) | 47.2 | 48.5 | 46.5 | 3.5 |
| Dissipation factor (tan δ) 50 Hz | $7.0 \times 10^{-3}$ | $6.1 \times 10^{-3}$ | $5.6 \times 10^{-3}$ | $7.8 \times 10^{-3}$ |
| Dissipation factor (tan β) after 48 hr. immersion in water, 50 Hz | $9.2 \times 10^{-3}$ | $7.5 \times 10^{-3}$ | $9.0 \times 10^{-3}$ | $9.0 \times 10^{-1}$ |

*No change was witnessed.
**Blistering was observed.

EXAMPLE 9

To 100 parts of the vinyl-group-containing solid organopolysiloxane prepared in Example 1 were added 1.5 parts of dicumyl peroxide. To the mixture were added phenyltrimethoxysilane, γ-aminopropyldimethylmethoxysilane and ethylene glycol in amounts given in Table VI. To the mixture thus prepared was added toluene so that their nonvolatile matter content became 10%. Using them, samples were prepared just as in Example 4, which proved to possess the properties given in Table VI. A similar procedure was repeated except that γ-aminopropyltrimethylsilane was used in place of the γ-aminopropyldimethylmethoxysilane. The results are shown also in the same table.

TABLE VI

| Sample number | 19 | 20 |
|---|---|---|
| Polysiloxane, containing vinyl group (1), parts | 100 | 100 |
| Phenyltrimethoxysilane, parts | 15 | 15 |
| γ-Aminopropyldimethoxysilane, parts | 7 | |
| γ-Aminopropyltrimethylsilane, parts | | 7 |
| Ethylene glycol mono-methyl ether, parts | 30 | 30 |
| Water absorption, percent | 1.34 | 1.47 |
| Condition after 1 hr. heating at 200° C | (*) | (*) |

*No change was witnessed.

What is claimed is:

1. A silicone resin composition comprising
   (1) 100 parts by weight of an organopolysiloxane, containing vinyl groups, represented by the average formula $$R^1{}_a(CH_2=CH)_b SiO_{\frac{4-a-b}{2}}$$

where $R^1$ is a same or different substituted or unsubstituted monovalent hydrocarbon group, and $a$ and $b$ are positive numbers, $b$ being from 0.05 to 0.5 and $(a+b)$ being from 1 to 2,
   (2) from 2 to 70 parts by weight of an alkoxy silane, represented by the general formula $$R^2{}_c Si(OR^3)_{4-c}$$

where $R^2$ and $R^3$ are each the same or different substituted or unsubstituted monovalent hydrocarbon groups, and $c$ is 1 or 2, or its partially hydrolyzed alkoxy polysiloxane,
   (3) from 1 to 60 parts by weight of an alkoxy silane, containing amino groups, represented by the general formula $$Z-NH-R^4-Si(OR^5)_d R^6{}_{3-d}$$

where $R^4$ is a divalent hydrocarbon group having from 1 to 4 carbon atoms, $R^5$ and $R^6$ are each the same or different substituted or unsubstituted monovalent hydrocarbon groups, Z is a hydrogen atom or an aminoalkyl group and $d$ is 1, 2 or 3, or its partially hydrolyzed alkoxy polysiloxane,
   (4) from 5 to 100 parts by weight of a hydrophilic organic solvent,
   (5) a solvent for component (1) above, and
   (6) an organic peroxide in a catalytic amount.

2. The silicone resin composition as claimed in claim 1 wherein component (1) is vinylmethylphenylpolysiloxane or vinylethylphenylpolysiloxane.

3. The silicone resin composition as claimed in claim 1 wherein component (1) is an organopolysiloxane, containing vinyl groups but substantially not containing silanol groups.

4. The silicone resin composition as claimed in claim 1 wherein component (2) is at least one alkoxysilane selected from the group consisting of phenyltrimethoxysilane,
methylphenyldimethoxysilane,
methyltriethoxysilane,
phenyltriisopropoxysilane and
1,3-diphenyl-1,1,3,3-tetramethyloxydisiloxane, or at least one partial hydrolyzate thereof.

5. The silicone resin composition as claimed in claim 1 wherein component (3) is at least one alkoxysilane selected from the group consisting of N-(trimethoxysilylpropyl)ethylenediamine,
γ-aminopropyltriethoxysilane,
N-(dimethoxymethylsilylpropyl)ethylenediamine,
N-β-aminoethylaminomethyltrimethoxysilane,
γ-aminopropyldimethylmethoxysilane and
γ-aminopropyltrimethylsilane.

6. The silicone resin composition as claimed in claim 1 wherein component (4) is at least one hydrophilic organic alcohol selected from the group consisting of methyl alcohol, ethyl alcohol, acetone, isopropyl alcohol, ethylene glycol, ethylene glycol monomethyl ether.

7. The silicone resin composition as claimed in claim 1 wherein component (5) is at least one solvent for component (1) selected from the group consisting of benzene, toluene and xylene.

8. A molding compound comprising the silicone resin composition of claim 1 which is blended with at least one inorganic filler selected from the group consisting of glass fiber, white carbon, iron oxide and powdered mica and quartz.

References Cited
UNITED STATES PATENTS 3,637,570   1/1972   Stout _____ 260—33.6 SB
3,671,485   6/1972   Marwitz et. al. ___ 260—33.4 SB
3,660,524   5/1972   Bauer et al. ___ 260—46.5 UA X LEWIS T. JACOBS, Primary Examiner U.S. Cl. X.R.

260—33.4 SB, 33.6 SB, 37 SB